United States Patent Office 3,364,218
Patented Jan. 16, 1968

3,364,218
PREPARATION OF POLY-1,4-
ETHYLENEPIPERAZINE
Walter H. Brader, Jr., Austin, Tex., assignor to Jefferson Chemical Company, Inc., Houston, Tex., a corporation of Delaware
No Drawing. Filed Apr. 7, 1966, Ser. No. 540,814
5 Claims. (Cl. 260—268)

ABSTRACT OF THE DISCLOSURE

Poly-1,4-ethylenepiperazines are prepared in good yield by treatment of an N-hydroxyethylpiperazine with a solid inorganic acidic catalyst in the liquid phase.

This invention is concerned with the preparation of poly-1,4-ethylenepiperazine. More particularly, this invention is concerned with the preparation of poly-1,4-ethylenepiperazine from N-hydroxyethylpiperazine.

Poly-1,4-ethylenepiperazine was described in United States Patent No. 3,165,482 wherein such polymers were prepared in relatively low yields from triethylenediamine. These polymers were disclosed to have fiber and/or film-forming properties. In addition to the low yields obtained, the process described also suffered from the serious disadvantage of starting with the very expensive compound, triethylenediamine.

I have now surprisingly discovered that a poly-1,4-ethylenepiperazine can be prepared in very good yield by treatment of an N-hydroxyethylpiperazine with a solid acid catalyst in the liquid phase. Since the N-hydroxyethylpiperazine is a readily available and relatively inexpensive starting material and yields are extremely high, my process offers an inexpensive route to poly-1,4-ethylenepiperazine.

In addition to N-hydroxyethylpiperazine itself, ring substituted N-hydroxyethylpiperazines bearing substituents that are inert under the conditions of the reaction may also be employed. Examples of inert substituents include alkyl and aryl groups containing from one to about eighteen carbon atoms. Thus, suitable starting materials for my process may be represented by the formula:

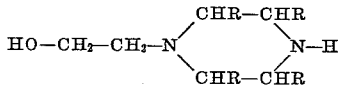

wherein each R is selected from the class consisting of hydrogen and alkyl and aryl groups containing from one to about eighteen carbon atoms. The preferred starting material is that in which each R is hydrogen. Other examples of suitable starting materials are those in which one or more R groups is methyl, ethyl, butyl, dodecyl, octadecyl, phenyl, nonylphenyl or butylphenyl.

The catalyst to be used in my process may be any solid acid catalyst such as those catalysts employed in the various processes for the preparation of triethylenediamine. Such catalysts are well known in the art and are described, for example, in U.S. Patents Nos. 2,937,176, 2,977,363, 2,977,364, 2,985,658, 3,056,788, 3,172,891 and 3,231,573. Specific examples of suitable solid acid catalysts include silica-alumina, alumina, tungsten oxide, aluminum phosphate and acid clays. The preferred catalyst for my process is a silica-alumina catalyst.

The reaction must be conducted in the liquid phase and is preferably conducted at a temperature within the range of from about 250° to about 500° C. under a sufficient pressure to maintain the N-hydroxyethylpiperazine in the liquid state. It is not necessary that hydrogen be present in the reaction mixture; however, the presence of hydrogen is preferred since when hydrogen is present, lighter colored products are obtained.

That poly-1,4-ethylenepiperazine can be obtained by my process is surprising in view of the report by Ishiguro et al., J. Pharm. Soc. Japan 75, 1370 (1955), that the conversion of N-hydroxyethylpiperazine over a silica-alumina catalyst results in the preparation of triethylenediamine in low yields. No other products were reported.

The process of my invention will be further illustrated by the following specific example.

Example 1

To a 1400 ml. rocking autoclave were added 564 grams of N-hydroxyethylpiperazine and 50 grams of a silica-alumina catalyst comprising 86% silica and 12% alumina. The autoclave was closed, flushed twice with hydrogen and the hydrogen pressure brought to 100 p.s.i.g. The contents of the autoclave were then heated to 325° C. and that temperature was maintained for three hours. The autoclave was cooled and a light yellow solid was removed. In examples in which no hydrogen was used, the solid removed from the autoclave was a dark, amorphous solid. The yield of solid from N-hydroxyethylpiperazine was essentially quantitative.

The solid polymer was dissolved in hot 1,4-dioxane and the solution filtered in order to remove the solid catalyst. The dioxane was removed by evaporation and the polymer was separated into fractions on the basis of:

(1) solubility in ether
(2) solubility in boiling ether and insolubility in ether at room temperature, and
(3) insolubility in boiling ether.

The infrared spectra of the fractions were very similar to that of N-ethylpiperazine except that the absorption due to terminal methyl was very low as compared to N-ethylpiperazine. A trace of vinyl absorption at 5.95 microns was observed. The near infrared spectra showed only a trace of N-H adsorption. Thus, the infrared spectra is consistent with the structure:

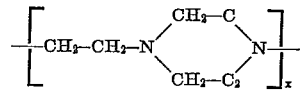

On the basis of molecular weight determinations by vapor pressure elevation using methanol as the solvent, x in the above formula is indicated to be within the range of from 2 to about 10.

Having thus described my invention, I claim:
1. A method for the preparation of a poly-1,4-ethylenepiperazine having the formula:

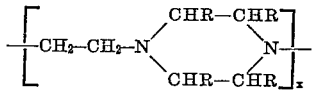

wherein each R is selected from the class consisting of hydrogen and alkyl and aryl groups containing from one to about eighteen carbon atoms and x is within the range of from about two to about ten which comprises treating an N-hydroxyethylpiperazine having the formula:

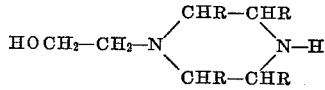

wherein each R is selected from the class consisting of hydrogen and alkyl and aryl groups containing from one to about eighteen carbon atoms with a solid inorganic acidic catalyst in the liquid phase at a temperature within the range of from about 250° to about 500° C.

2. A method as in claim 1 wherein hydrogen is included in the reaction mixture.

3. A method as in claim 2 wherein the catalyst is a silica-alumina catalyst.

4. A method as in claim 2 wherein each R is hydrogen.

5. A method as in claim 4 wherein the catalyst is a silica-alumina catalyst.

No references cited.

HENRY R. JILES, *Primary Examiner.*